UNITED STATES PATENT OFFICE.

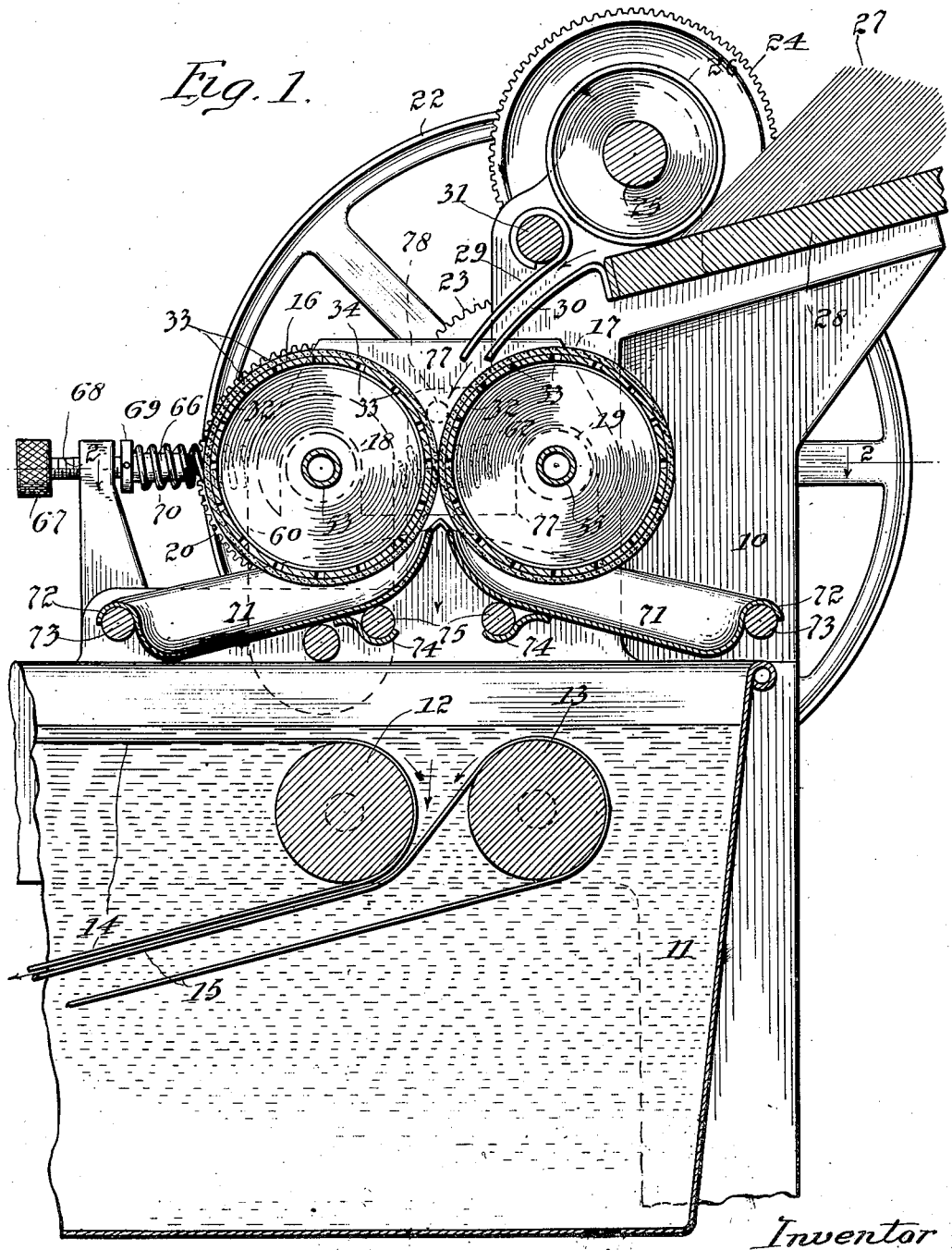

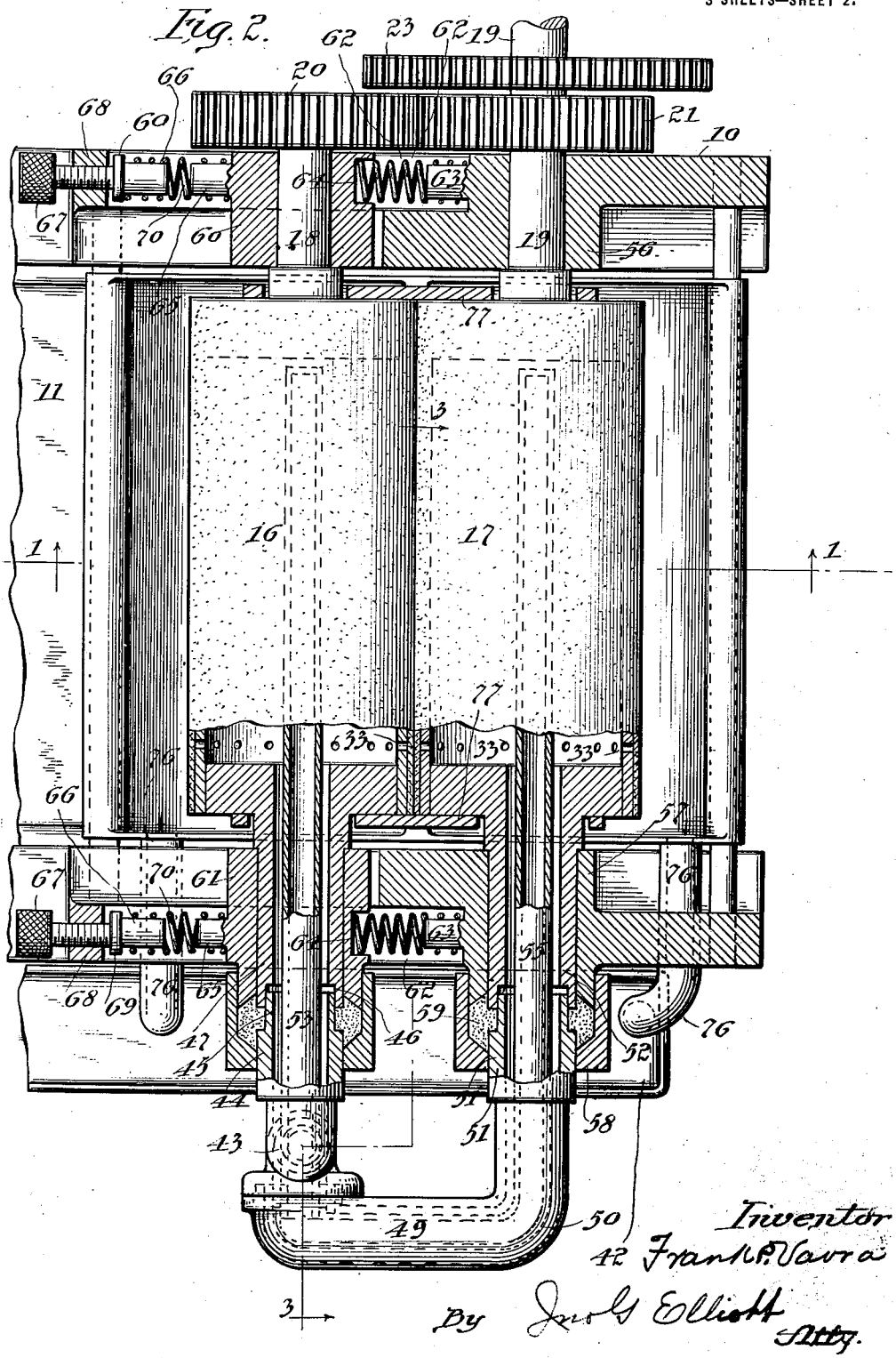

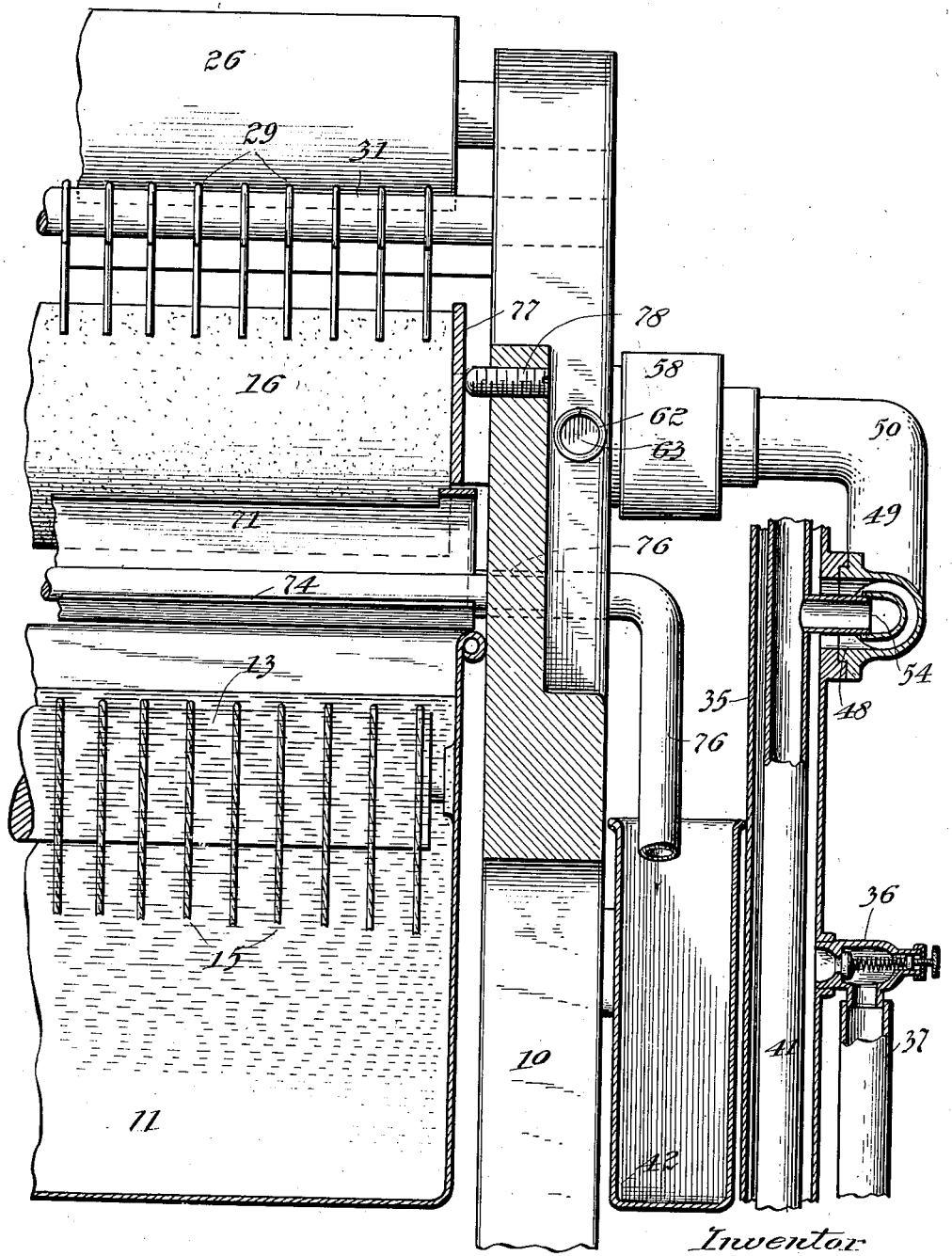

FRANK P. VAVRA, OF CICERO, ILLINOIS.

MACHINE FOR COATING BLANKS WITH PARAFFIN.

1,327,300.  Specification of Letters Patent.  Patented Jan. 6, 1920.

Application filed August 9, 1918, Serial No. 249,157. Renewed November 1, 1919. Serial No. 335,111.

*To all whom it may concern:*

Be it known that I, FRANK P. VAVRA, a citizen of the United States, and a resident of Cicero, in the county of Cook and State of Illinois, have invented certain new and useful Improvements in Machines for Coating Blanks with Paraffin, of which the following is a full, clear, and exact specification.

My invention is concerned with machines for coating blanks with paraffin of the general class shown in the Vavra Patent No. 1,198,976, and has for its object the elimination of the tank heretofore employed in which one or more of the gaging rolls rotates, and the supplying accurately of the necessary amount of paraffin to effect the coating through the axes of the gaging rolls, which to this end are hollow, and have perforations in the peripheries through which the necessary amount of paraffin is forced either by centrifugal action or hydrostatic pressure, as may be desired.

It also contemplates the supplying of the gaging rolls through their axes, of some heating medium, such as steam, which will keep the paraffin in a liquid state within the rolls.

To illustrate my invention, I annex hereto three sheets of drawings in which the same reference characters are used to designate identical parts in all the figures of which—

Figure 1 is a central vertical section on the line 1—1 of Fig. 2;

Fig. 2 is a horizontal section on the line 2—2 of Fig. 1; and

Fig. 3 is a vertical section on the line 3—3 of Fig. 2.

The machine is preferably provided with a suitable cast iron frame 10, within which will be seated or supported a customary cooling water tank 11, which will be provided with the customary rolls 12 and 13, and the endless strings 14 and 15, and other suitable rolls coöperating with the strings so that the hot coated cartons dropped down into the receiving angle of the strings between the rolls 12 and 13 will be carried through the cold water to chill and set the paraffin on the surface of the blanks or cartons in the customary manner. The use of this cooling water tank is old and *per se*, forms no part of my present invention.

Above the receiving angle between the rolls 12 and 13, I journal in the frame 10, the pair of gaging rolls 16 and 17, which are preferably provided at one end with the solid axles 18 and 19 journaled in suitable bearings in the framework 10, as will be subsequently described, and having on their ends the intermeshing spur gear wheels 20 and 21, the shaft or axle 19 being extended and carrying at its outer end the belt wheel 22 by which the machine is driven, and, where an automatic feed is provided, also carrying the spur gear wheel 23 which meshes with the spur gear wheel 24 secured on the shaft 25 of the rubber faced feed roller 26 which coöperates with the carton blanks 27 piled on the feed board 28 in the customary manner. The cartons are directed to the receiving angle of the gaging rolls 16 and 17 by two sets of guide wires 29 and 30, the wires 29 being conveniently hooked upon the spacing rod 31 extending across the top of the machine between the frame members, while the wires 30 are secured to the bottom of the feed board 28.

The bodies of the gaging rolls 16 and 17 are formed of the hollow metallic cylinders 32 which are provided with numerous perforations 33 in the surface thereof, and surrounding the metallic cylinder is the layer 34 of felt, or some other suitable fibrous material, of a thickness of say a quarter of an inch or more, which felt becomes saturated with the melted paraffin escaping from the hollow interior of the gaging rolls 16 and 17 through the perforations 33. This paraffin is preferably supplied from a pipe 35, in which suitable pressure is maintained by any desired means. To relieve the pressure if it accidentally gets too high, I employ a pressure relief valve 36 connected to the pipe 35 and to a return pipe 37, leading back to the paraffin supply from which the pipe 35 is supplied. This pipe 35 is preferably of a considerable diameter, and incloses a steam supply pipe 41, which I have conveniently shown as rising alongside of the paraffin drain 42, located at one side of the machine. The pipe 35 extends upward and is connected by the curved portion 43 with the horizontal bearing end 44, which has the reduced end portion 45 entering the flanged end 46 of the rotating bearing sleeve 47 which forms the axle for that end of the gaging roll 16. The pipe 35 is provided with the swinging joint connection 48 to the auxiliary pipe 49 which also has the curve 50 therein and the bearing end 51 constructed like the bearing end 44 of the associated pipe, and having its reduced inner end telescoped in the bearing sleeve 52 of the gaging roll 17. The steam supply pipe 41 extends upward through the pipe 35, and also has a right angle bend in the curve 43 and has its horizontal extension 53 extending substantially to the other end of the center of the gaging roll 16, where it is closed, so that the steam can enter the pipe 53 in the roller and keep its contents liquid, without permitting the water of condensation to escape into the roller and thus mix with the paraffin. The pipe 41 is supplied at the joint 48 with a similar interior joint 54 so that the roll 17 may be supplied in its interior with a steam pipe 55 corresponding exactly to the pipe 53 of the roll 16.

The solid axle 19 is mounted in a stationary bearing 56 formed in the frame, and the hollow axle 52 of the roll 17 is mounted in a similar, but necessarily larger, stationary bearing 57. A packing nut 58 inclosing the packing 59 and secured on the end of the bearing serves to make the joint liquid-tight in spite of the rotation of the roll. The solid axle 18 is mounted in a bearing 60 sliding in suitable horizontal ways formed in that side of the frame 10, while the hollow bearing 47 is journaled in a similar movable bearing 61 mounted in corresponding ways in that end of the frame. The two rolls 16 and 17 are urged apart with the desired adjustable force by means of the pair of helically coiled expanding springs 62 at either end surrounding the lugs 63 formed on the bearings 56 and 57, and having their other ends preferably located in recesses 64 formed in the movable bearings 60 and 61, which movable bearings have on the other side the lugs 65 opposed to the ends 66 of the set screws 67 which are threaded through lugs 68 formed on the framework 10. The ends of the set screws 67 are provided with the collars 69 secured thereon which form abutments for the outer ends of the helically coiled expanding spring 70 surrounding the ends of the set screws and the lugs 65 and put under the desired tension by the adjustment of the set screws 67. By the arrangement shown, it will be obvious that the pressure between the gaging rolls 16 and 17 can be adjusted to a nicety so as to control the amount of paraffin that will be carried off by the blanks passing downward between the rolls.

As the action of the gaging rolls may deliver slightly more paraffin than the blanks take up, I provide for the excess of the paraffin by a pair of catch basins 71, located beneath them, which are shallow sheet metal trays held in place at their outer ends by the hooked flanges 72 catching over the spacing rods 73 extending across the machine, and at their inner ends by the hooked flanges 74 tucked under similar spacing rods 75. The basins are provided with a pair of pipes 76 opening into the lowest portion thereof at one end and extending outward and downward so as to empty into the paraffin drip tank 42.

The operation of my improved apparatus will be readily apparent. The machine is run at a constant speed, so that the centrifugal force of the paraffin tending to drive it through the perforations 33 and into the felt 34 will be uniform, and the melted paraffin from the pipe 35 will flow through the connections described into the hollow interiors of the rolls. The centrifugal force of the rotating rolls and the pressure of the paraffin in the pipe 35 will serve to force out a substantially uniform amount of paraffin, and as the blanks 27 are fed either by hand or automatically down between the guides 29 and 30, they will be caught by the gaging rolls and passed between them, and both sides coated uniformly with paraffin. Any excess of paraffin will be removed by the squeezing action of the rolls which are forced toward each other with some considerable pressure by the springs as above described. The blanks pass straight down between the rolls and between the pans 71 and are delivered to the engaging angle of the cords 14 and 15 between the rolls 12 and 13, so that the blank thickly coated with hot paraffin is chilled before the paraffin has time to penetrate the body of the blank.

I may prevent the paraffin from escaping from the angle formed between the rolls at the top by placing at the ends of the rolls the plates 77, which fit over the axles and are secured in place by the set screws 78 threaded through the frame 10, as clearly shown in Fig. 3.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new and desire to secure by Letters Patent of the United States is:

1. In an apparatus of the class described, the combination with a pair of gaging rolls having perforations in their metallic shells and an external fibrous covering, of means for pressing said rolls into engagement with each other, means for rotating the rolls, and means for supplying the interior of the rolls with the coating liquid.

2. In an apparatus of the class described, the combination with a pair of gaging rolls having perforations in their metallic shells and an external fibrous covering, of a heating pipe extending through the axle of each roll at one end, means for pressing said rolls into engagement with each other, means for rotating the rolls, and means for supplying the interior of the rolls with the coating liquid.

3. In an apparatus of the class described, the combination with a pair of gaging rolls having perforations in their metallic shells and an external fibrous covering, of means for pressing said rolls into engagement with each other, means for rotating the rolls, means for supplying the interior of the rolls with the coating fluid, and a pair of drip pans placed beneath the rolls having their adjacent edges separated to form a passage for the blanks.

4. In an apparatus of the class described, the combination with a pair of gaging rolls having perforations in their metallic shells and an external fibrous covering, of paraffin supply pipes entering through the axles of the rolls at one end, heating pipes within the paraffin supply pipes and extending the length of the rolls, means for pressing said rolls into engagement with each other, and means for rotating the rolls.

In witness whereof, I have hereunto set my hand and affixed my seal, this 31st day of July, A. D. 1918.

FRANK P. VAVRA. [L. S.]

Witnesses:
C. M. STUMCKE,
JNO. G. ELLIOTT.